Figures 3, 4:
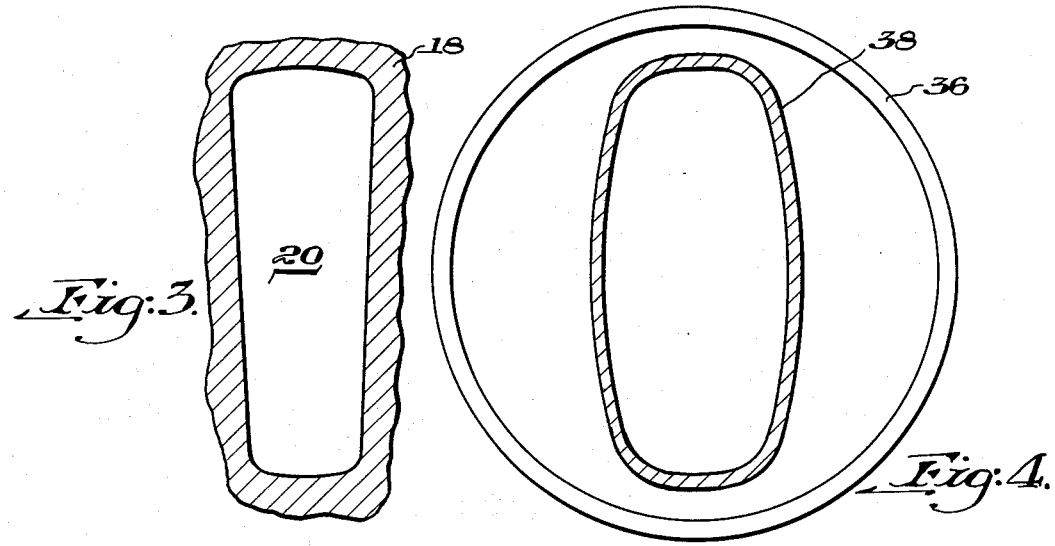

May 29, 1956  F. M. VAN DEVENTER  2,747,831
VALVE AND PIPE LINE ASSEMBLIES
Filed Nov. 10, 1948  2 Sheets-Sheet 1
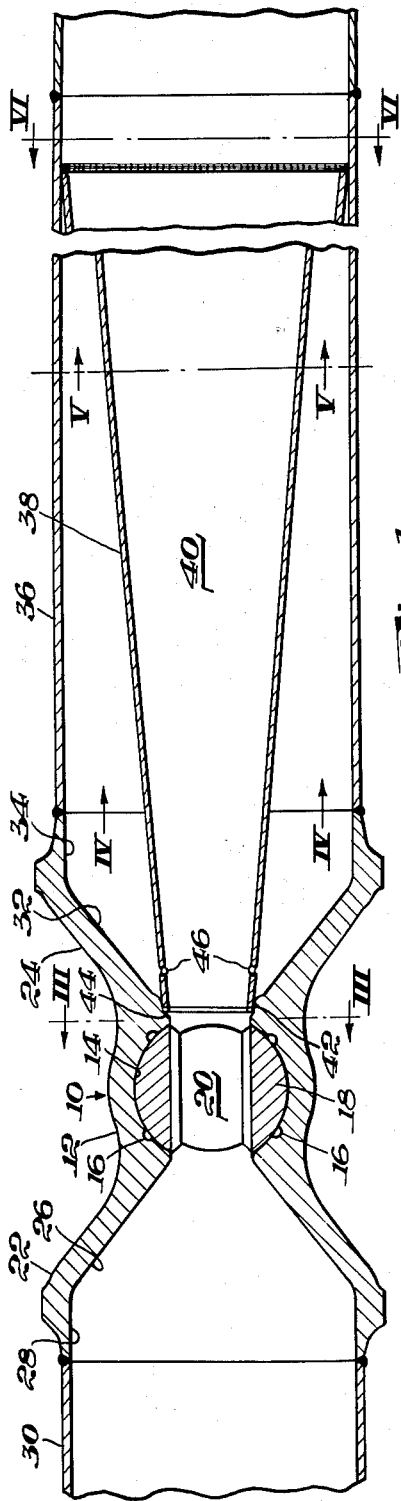
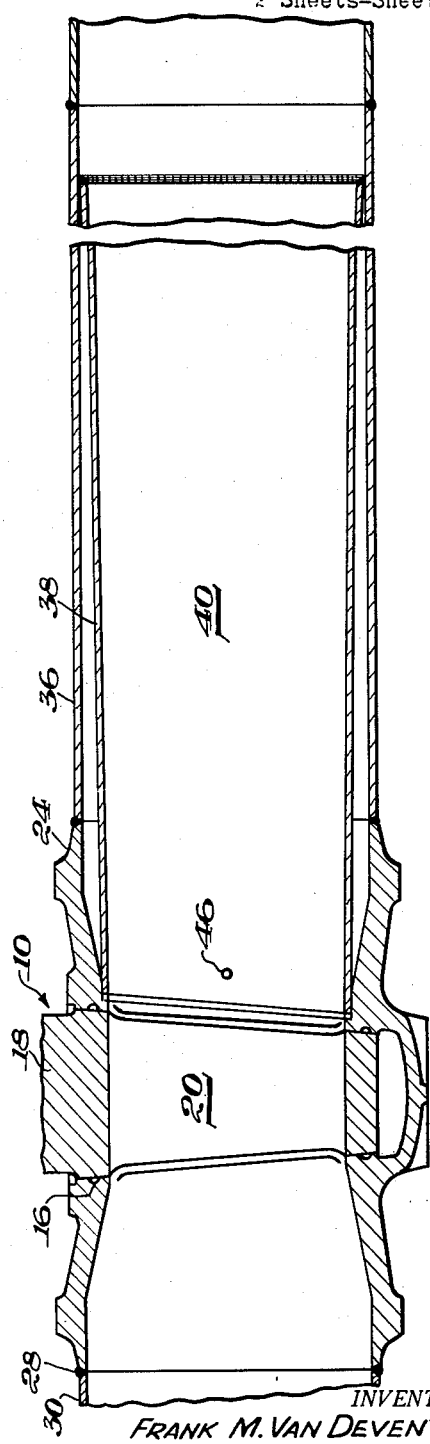
INVENTOR.
FRANK M. VAN DEVENTER.
BY
his ATTORNEY.

May 29, 1956     F. M. VAN DEVENTER     2,747,831
VALVE AND PIPE LINE ASSEMBLIES

Filed Nov. 10, 1948     2 Sheets-Sheet 2

INVENTOR.
FRANK M. VAN DEVENTER.
BY
his ATTORNEY.

United States Patent Office 2,747,831
Patented May 29, 1956

2,747,831

VALVE AND PIPE LINE ASSEMBLIES

Frank M. Van Deventer, Westfield, N. J., assignor, by mesne assignments, to Walworth Company, New York, N. Y., a corporation of Massachusetts Application November 10, 1948, Serial No. 59,257

6 Claims. (Cl. 251—124)

This invention relates to valves and, more particularly, to plug valve assemblies for pressure recovery purposes, and is an improvement of the valve device disclosed in applicant's copending application Serial Number 25,002, filed May 4, 1948, now Patent No. 2,717,758 granted September 13, 1955.

In the conventional design of plug valves, the relatively abrupt enlargement of flow area from the plug to the downstream port of the valve necessarily involves a pressure drop in the fluid being conveyed therethrough. Such pressure drop becomes cumulative in long pipe lines where a multiplicity of plug valves is installed at intervals in the line. This reduces the amount of fluid which can be transported through a given size pipe and necessitates an increase in the power required to force a given quantity of fluid through the line.

The problem has been accentuated over a period of years due to the use of increasingly larger pipe lines, particularly for cross-country fluid transport. The increased cost of valves comparable in size to such lines has led to the use of smaller valves in an endeavor to reduce the overall capital investment. Consequently, a considerable increase in pressure loss as compared to that through full size valves has been encountered. This has restricted the usefulness of plug valves despite definite advantages which this type of valve possesses; one particular advantage being that plug valves readily lend themselves to the application of lubricating principles which are now embodied in the well known lubricated plug valve.

An object of this invention is to reduce the pressure loss in valves without material alteration in standard forms to adapt them to the improved arrangement.

Another object of the invention is to achieve the desired result without necessitating departure from the conventional form of port opening in plug valves or any increase in the port area.

Another object of the invention is to utilize most effectively the increased velocity which accompanies flow through the restricted port of the plug, so as to effect optimum pressure recovery downstream of the plug.

Another object of the invention is to permit the use of valves of smaller rated size than the pipe line in which they are installed without undue loss of efficiency, in fact in some cases with increased efficiency.

Another object of the invention is to increase the conversion of velocity into pressure to substantially its highest efficiency.

Other objects and advantages will become apparent from the following description taken in connection with the accompanying drawings wherein:

Fig. 1 is a longitudinal sectional plan view of a plug valve and pipe line assembly embodying the invention, Fig. 2 is a longitudinal sectional elevation corresponding to Fig. 1 and Figs. 3 through 6 are cross-sectional views on lines III—III through VI—VI, respectively of Fig. 1, but on an enlarged scale.

Referring more particularly to the drawings, the plug valve element of this invention is shown as comprising a lubricated plug valve 10 of conventional form and modified only slightly as will appear hereinafter. The plug valve 10 comprises a casing 12 having a seating surface 14 therein which may be of conical form and provided with lubricating grooves 16 as is customary. A rotatable plug member 18 is positioned in the casing 12 and may be of conical form for cooperation with the seating surface 14.

The plug member 18 is provided with a port 20 extending therethrough and which is of trapezoidal form as illustrated in Fig. 3. When the plug member 18 is in the open position shown in Figs. 1 and 2, then fluid is admitted thereto from an inlet 22 and is conveyed therefrom by an outlet 24 which are positioned respectively on the casing 12 on opposite sides of the plug member 18. Any customary means for limiting rotation of the plug member 18 to ninety degrees and for effecting lubrication may be provided so that further description is deemed unnecessary.

The inlet 22 is of hollowed tapered construction having a tapered opening 26 which converges from the outer end for registry with the adjacent end of the port 20 in the plug member 18. The included angle of the tapered opening 26 is usually 80° or more in horizontal section (Fig. 1) hereafter called the major dimension and such angle is retained in this embodiment of the invention. The opening 26 preferably merges from a trapezoidal form at its inner or smaller end, conforming to the shape of the port 20, into a substantially circular opening 28 at its outer or larger end as indicated in Figs. 1 and 2 of the drawings. The outer end 28 of the inlet 22 is adapted for connection to a pipe section 30 which is of cylindrical tubular form. Since it has become common practice to weld successive sections of pipe lines together, the valves used in such pipe lines are similarly equipped with welding ends so that they also may be welded into the pipe line. Accordingly, the generally circular outer end 28 of the inlet 22 terminates in a welding end portion which is shown as welded to the tubular pipe section 30.

As the inlet 22 is of generally conventional form, an abrupt change from one area to another occurs in the fluid passing from the pipe section 30 and the inlet 26 to the port 20. It will be apparent that when a similar abrupt change occurs in a reverse direction, such as when the fluid emerges from the port 20 into a conventional outlet, there is a considerable restriction of flow area in the central portion of the valve body 12 which bears some resemblance to a Venturi tube. However, only a slight loss occurs in the converging or inlet channel and some of the fluid pressure is converted into velocity of the fluid.

This invention is more particularly concerned with recovery of fluid pressure. It is well known that the effectiveness of reconversion of velocity into pressure in the downstream channel of a Venturi tube depends upon the difference in flow area at the throat as compared to the area at the mouth; but more importantly it depends upon the angle between the sides of the flow channel. When this angle is 80° or more in major dimension, as in the case of conventional valves, the loss due to turbulence and shock is as great as though the change in section were an "abrupt enlargement," i. e., an immediate change from one area to a larger area. In this invention, certain changes to be described have been made in conjunction with the outlet port of the conventional valve, but in combination with supplementary structure also to be described. The combination provides a continuous flow channel beginning at the valve plug member 18 of such proportions as to accomplish a highly efficient conversion of the velocity into pressure.

To this end, the outlet 24 of hollowed tapered construction is provided with a tapered opening 32 which diverges from registry with the port 20 and terminates in a substantially circular opening 34 at its outer or larger end. Generally, the outlet 24 is similar in most respects to the inlet 22 and retains the same included angle of substantially 80° in major dimension of the tapered opening 32. As in the case of the inlet 22, the outlet 24 terminates in a welding end connection which is shown as welded to one end of a tubular pipe section 36. The first or outlet pipe section 36 may be similar in all respects to the inlet pipe section 30 and, consequently, is generally circular in contour and has its inner wall defining a cross-sectional area substantially equal to that of the larger end of the outlet 24.

Positioned within the outlet 24 and the first tubular pipe section 36, is a second tubular pipe section 38 having a tapered opening 40 which will be described in detail hereinafter. The smaller end of the second tubular pipe section 38 is carried in a recess 42 formed in the inner wall of the outlet 24 adjacent the port 20 and defining a shoulder 44. Preferably, the end of the second tubular pipe section 38 is normally spaced from the shoulder 44 and has slidable engagement with the wall of the recess 42. Consequently, as the second tubular member 38 is not anchored at its inner end to the valve body 12, it is left free to expand and contract therein without causing distortion of the valve body 12 and consequent leakage past the plug member 18. However, the outer or larger end of the second tubular pipe section 38 is preferably secured by welding to the first tubular pipe section 36 as indicated in the drawings, Figs. 1 and 2. Due to the elongated shape of the second tubular pipe section 38, such welding connection of the outer end thereof is remote from the slidable connection of the inner or smaller end thereof with the valve body 12. In addition, the second tubular pipe section 38 is provided with a plurality of apertures 46 through the wall thereof adjacent the port 20 of the plug member 18 to provide for the entrance of line fluid between the first and second tubular pipe sections 36 and 38, respectively. It will be understood that the welding connection could be at the inner, instead of the outer, end of the pipe section 38 or both ends could be so secured to the first pipe section 36 without departure from the purview of this invention.

Figures 5, 6:
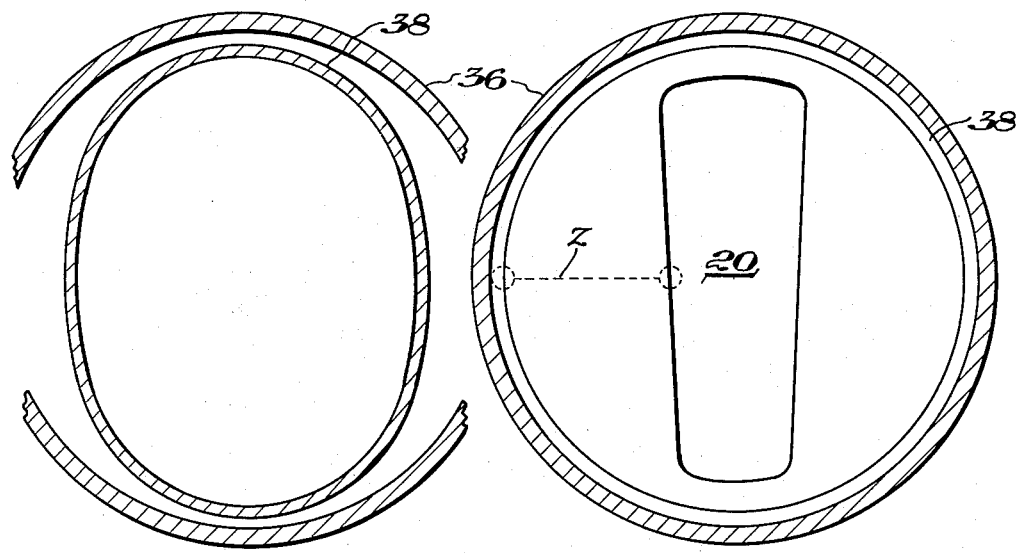

As the precise shape of the second tubular pipe section 38 has an important part in accomplishing the features of this invention, a preferred embodiment will now be more particularly described in connection with Figs. 4, 5 and 6 showing sectional views taken at various points along the second tubular pipe section 38. As will be apparent from the longitudinal sectional views of Figs. 1 and 2, the pipe section 38 forms an elongated channel generally resembling a frustrum of a cone. At its inlet or smaller end adjacent the shoulder 44, the cross-section of the pipe section 38 is of somewhat trapezoidal form to conform to the shape of the plug port 20, as shown in Fig. 3. At intermediate points between the smaller and larger ends as indicated on the sectional views, Figs. 4 and 5, the contour of the pipe section 38 varies between a circle and a trapezoid and is in the nature of an ellipse.

Generally, in such construction the contour of the second tubular pipe section 38 is described by a series of straight lines connecting homologous points on the periphery of the port 20 and the substantially circular opening in the first tubular pipe section 36 as indicated by the broken line Z in Fig. 6. Such a straight line Z will touch the inner wall of the pipe section 38 substantially throughout the length of such line Z. The length of the second tubular pipe section 38 is determined so as to provide a maximum included angle of about ten degrees between opposite sides. Thus, the included angles in major and minor dimensions defined by the inner wall of the second tubular pipe section are approximately ten degrees in horizontal section (Fig. 1) and about three degrees in vertical section (Fig. 2). It is not essential that the inner end of the second pipe section 38 adjacent the shoulder 44 exactly match the trapezoidal form of the plug port 20 as described. An efficient compromise can be effected by continuing the sectional shape of Fig. 4 to the extreme inner end but with flattened sides and of a substantially uniform width conforming to the larger width at the top of the plug port 20 as viewed in Fig. 3 and of similar length.

As will be apparent, the first tubular pipe section 36 has a cross-sectional area substantially in excess of that of the port 20. Since one of the important advantages of the invention is that it permits the economical use of valves of smaller size than the pipe, such reduction in cross-sectional area may be intentional. For example, with a 30 inch diameter pipe line exemplified by the first tubular pipe section 36, there could be used a valve with 30 inch diameter welding ends and a standard so-called 24 inch plug member 18. In such event, the length of the second tubular pipe section 38 would be approximately 112 inches to provide the necessary maximum included angle as described. For smaller valves and pipe line constructions, the pipe section 38 could be produced by casting in steel or other materials whereas for the larger sizes such as disclosed herein, it could well be economically fabricated from plate stock, such as rolled steel material. It will be understood that valves with one or more flanged ends for bolting to the pipe line could equally well be used in place of the welding end valve shown and described herein.

These and other modifications and changes in the arrangement and combination of parts and in the details of construction can be made without departure from the scope of the invention as defined in the appended claims.

I claim:

1. A plug valve and pipe line assembly comprising a valve casing having a seating surface therein, a rotatable plug member cooperable with said seating surface and having a port of trapezoidal form in cross-section extending therethrough, said casing having a pair of end portions on opposite sides of said port and provided with tapered inlet and outlet openings respectively adapted for registry at the smaller ends thereof with said port, said outlet opening being recessed to form a shoulder adjacent said smaller end thereof, a tubular pipe section connected at one end to said outlet end portion and having an inner wall defining a substantially uniform circular cross-sectional area substantially equal to the larger end of said tapered outlet opening, and a second tubular pipe section positioned within the first said pipe section and having the inner end thereof adapted for slidable engagement with the wall of said recess and normally spaced from said shoulder, said second pipe section having a tapered opening adapted for diverging from registry at said inner end thereof with said port and being of substantially similar form in cross-section at said inner end as said plug port and of substantially circular form in cross-section at the outer end thereof, said second pipe section having a portion intermediate said inner and outer ends of substantially elliptical form for blending said inner and outer end forms together and being welded at said outer end to said first pipe section remote from the connected end thereof.

2. A plug valve for pipe line assembly comprising a valve casing adapted for insertion between the ends of a pair of oppositely disposed tubular pipe sections, said valve casing having opposite end portions the terminus of which is of substantially circular cross section, one of said casing portions defining an inlet passage converging in one direction to a valve seat from the diameter of one of the pipe sections with which it is adapted to be associated, the other of said portions including an outlet passage extending in an opposite direction from the valve seat, a rotatable plug valve member cooperable with said seat and having a port of substantially rectangular cross-section, said passages having at least the portion adjacent their intersection with the valve seat formed of substantially rectangular cross-section with which said plug port is adapted to register to form a supplemental connecting conduit in the open position of said valve member, and a tapered pipe section positioned at said outlet passage end of said casing and engaging at its smaller end with said valve casing, said smaller end being of substantially rectangular cross-section forming a continuation of said outlet passage portion and diverging into substantially circular cross-section at its larger end, said tapered pipe section having an included angle in its major dimension of approximately ten degrees, said tapered pipe section adapted to be surrounded by the other of the tubular pipe sections and at the larger end thereof adapted to be connected to the other of the tubular pipe sections.

3. A plug valve for pipe line assembly as claimed in claim 2 wherein said tapered pipe section has an included angle in its minor dimension of approximately 3°.

4. A plug valve for pipe line assembly as claimed in claim 3 wherein said inlet passage has an included angle in its major dimension of approximately 80°.

5. A plug valve for pipe line assembly as claimed in claim 4 wherein said tapered pipe section has a portion intermediate the smaller and larger ends thereof of substantially elliptical form for blending said substantially rectangular and circular cross-sections together.

6. A plug valve for pipe line assembly as claimed in claim 5 wherein said larger end of said tapered pipe section is adapted to be permanently secured to the inner wall of said one tubular pipe section, said outlet passage portion being recessed to receive said smaller end of said tapered pipe section with the end wall thereof normally spaced from the bottom of said recess to accommodate expansive movement of said tapered pipe section at said smaller end.

References Cited in the file of this patent

UNITED STATES PATENTS

| | | |
|---|---|---|
| 842,393 | De Ferranti | Jan. 29, 1907 |
| 2,414,751 | Ludeman | Jan. 21, 1947 |

FOREIGN PATENTS

| | | |
|---|---|---|
| 339,889 | Great Britain | Dec. 18, 1930 |
| 422,829 | France | Jan. 30, 1911 |

OTHER REFERENCES

A. S. M. E. Research Publication, Fluid Meters, Description of Meters, Part 2, Report of A. S. M. E. Special Research Committee on Fluid Meters, published in 1931 by the American Society of Mechanical Engineers, 29 West Thirty-ninth St., New York, N. Y.

Marks Mechanical Engineer's Handbook (fourth edition), pages 259 and 2101, published 1941 by McGraw-Hill Book Co., Inc., N. Y.

Text on Hydraulics by Hughes and Safford, McMillin Co., copyright 1926, pages 225 and 227.

Text on Hydraulics (fourth edition) by R. L. Daugherty, published 1937 by McGraw-Hill Book Co., Inc., New York, N. Y., page 158.

Bulletin No. 5 of Ludeman Valve Div., Skinner Engine Co., 420 Lexington Ave., New York 17, N. Y., entitled Ludeman DU-AL High Pressure Valves, published 1945 or earlier. (See this application amendment F, paper No. 15, page 3, last 3 lines, and page 4, first two lines.)